United States Patent [19]

Nishimura et al.

[11] 4,426,852
[45] Jan. 24, 1984

[54] AIR-CONDITIONING CONTROL APPARATUS FOR AUTOMOTIVE VEHICLES

[75] Inventors: Masao Nishimura, Anjo; Teiichi Nabeta, Okazaki; Toshitaka Fujiwara, Kariya, all of Japan

[73] Assignee: Nippondenso Co., Ltd., Kariya, Japan

[21] Appl. No.: 260,601

[22] Filed: May 6, 1981

[30] Foreign Application Priority Data

Feb. 5, 1980 [JP] Japan .................... 55-62518

[51] Int. Cl.³ .................... F24F 7/00; B60H 3/00
[52] U.S. Cl. .................... 62/179; 165/16; 165/43; 236/49
[58] Field of Search .................... 236/49; 165/16, 43; 98/121 A; 62/186, 179

[56] References Cited

U.S. PATENT DOCUMENTS 4,086,781  5/1978  Brody et al. .................... 236/49 X
4,272,015  6/1981  Houser .................... 236/49

*Primary Examiner*—William E. Wayner
*Attorney, Agent, or Firm*—Cushman, Darby & Cushman

[57] ABSTRACT

In an automobile air-conditioning control apparatus, in accordance with a setting temperature signal and an actual temperature signal, a microcomputer controls the rotational speed of blower motors and shifts the direction of flow changing plates, so that the control between a concentrated blowing condition and an overall blowing condition may be effected successively and gradually.

5 Claims, 6 Drawing Figures

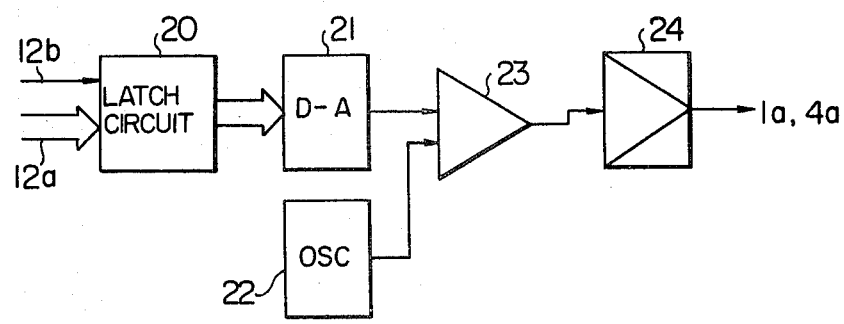
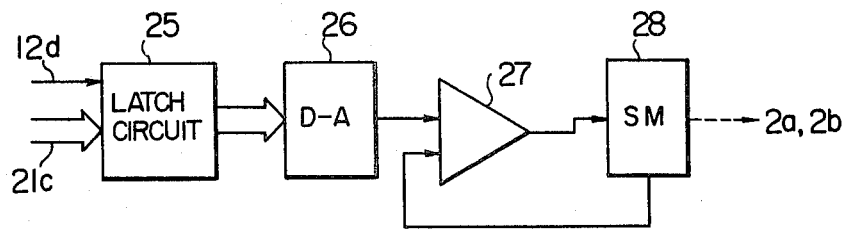
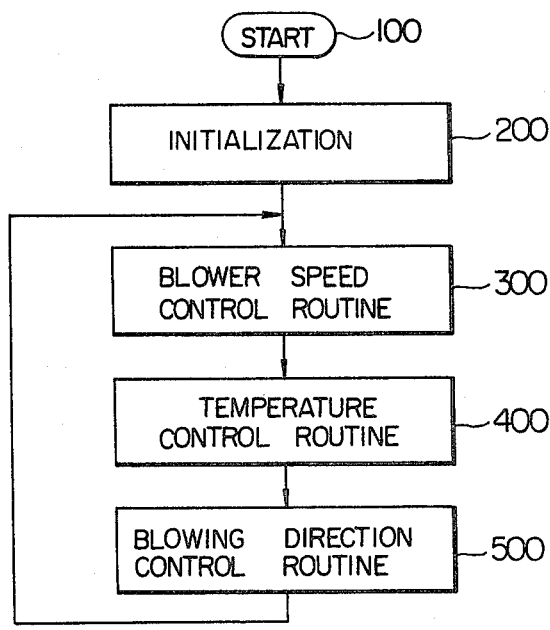

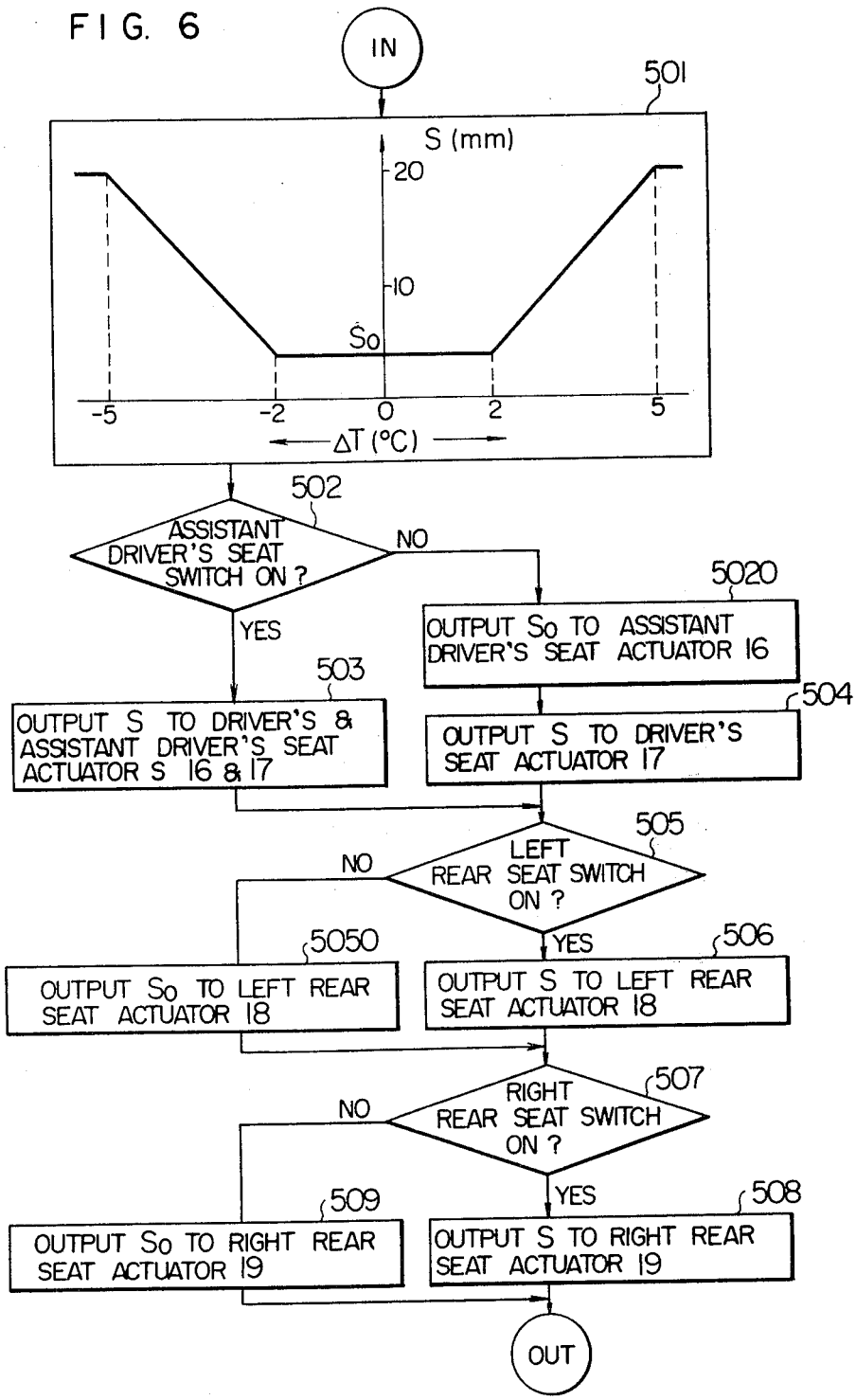

AIR-CONDITIONING CONTROL APPARATUS FOR AUTOMOTIVE VEHICLES

The present invention relates to an air-conditioning control apparatus for automobiles which is designed so that the direction of flow of the temperature-adjusted air into the vehicle compartment is shifted to control the air-conditioning of the vehicle compartment.

In the past, it has been the practice so that when quick cooling is desired as when the inside temperature of the vehicle compartment of an automobile is high, the occupants of the automobile personally control and shift the air outlets provided on the center, left and right sides of the compartment to direct the cooled air toward them and produce a feeling of quick cooling, and after the inside temperature of the compartment has decreased gradually the center, left and right air outlets are again controlled and shifted suitably so as to reduce the amount of the cooled air blown directly toward the occupants and thereby to air-condition the whole compartment.

Such manual operation is disadvantageous in that since the center, left and right air outlets are shifted only when the occupants feel cold or hot, a considerable time is required for the occupants to attain a stable air-conditioned state and it is also necessary to frequently shift the air outlets for this purpose.

With a view to overcoming the foregoing deficiencies in the prior art, it is the object of the present invention to provide an improved control apparatus so designed that during the transitional period in the air-conditioning of the compartment of an automobile, the direction of flow of issuing air is successively controlled in accordance with the difference between the compartment temperature and the desired temperature in the course of the air-conditioning, where the feeling of air-conditioning on the part of the occupants is successively adjusted to the desired conditions during the transition from the transient operating condition to the steady-state operating condition of the system.

Other objects and advantages of the present invention will become apparent from the following description taken in conjunction with the accompanying drawings showing a preferred embodiment of an automobile air-conditioning control apparatus according to the invention which is designed to operate effectively with respect to the object occupants in all the seats.

In the drawings:

FIG. 2 is a block diagram showing in detail the construction of the motor drive circuits 14 and 15 shown in FIG. 1;

FIG. 3 is a block diagram showing in detail the construction of the shifting actuators 16, 17, 18 and 19 shown in FIG. 1;

FIG. 4 is a computing flowchart showing the overall computing operation performed by the microcomputer of FIG. 1 in accordance with a control program;

FIG. 6 is a computing flowchart showing the detailed computing operations of the blowing direction controlling operational routine shown in FIG. 4.

Figure 1:
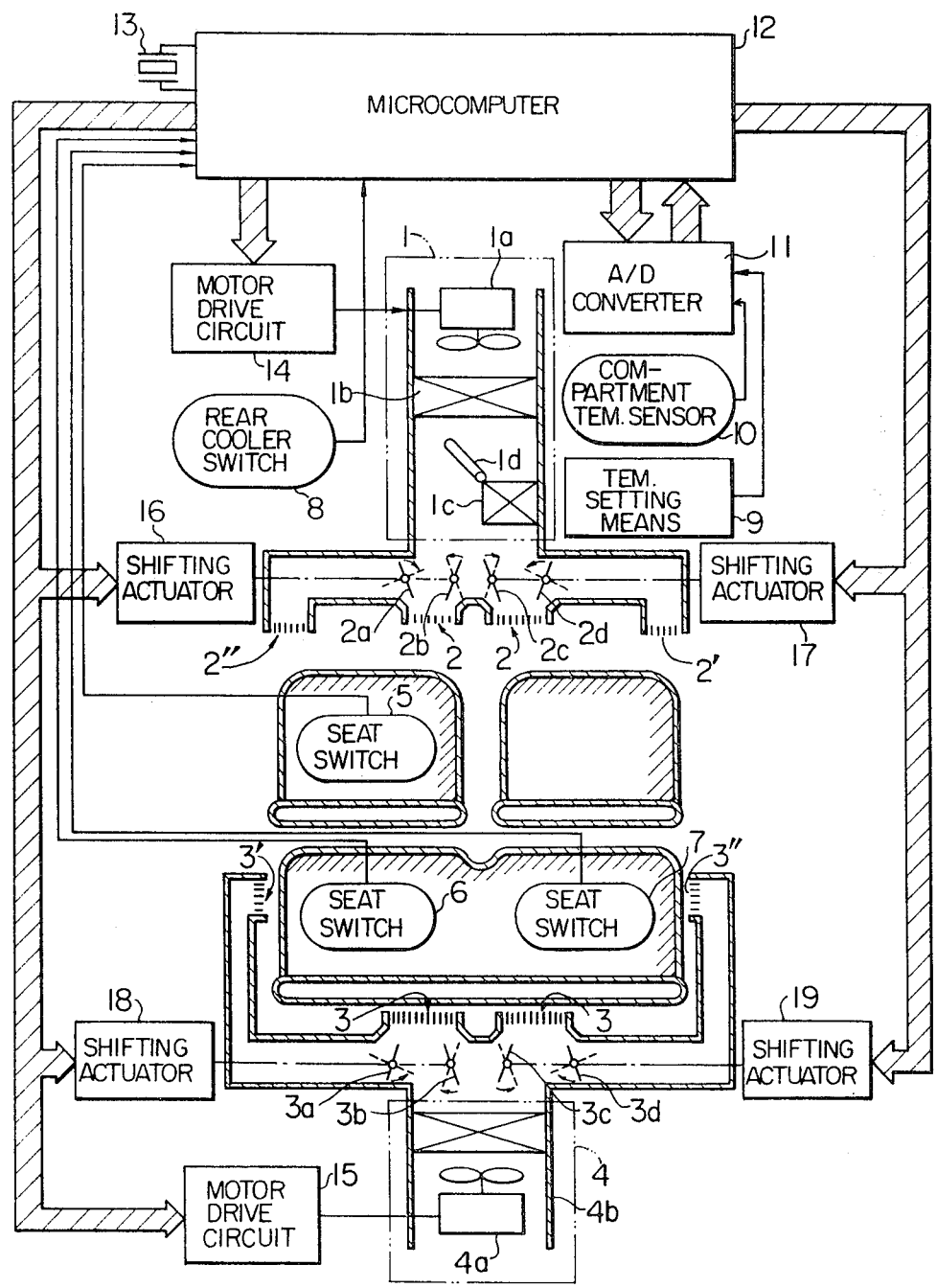
FIG. 1 is a schematic block diagram showing the overall construction of an embodiment of the present invention.

Referring to FIG. 1, there is illustrated the overall construction of an embodiment of the present invention.

In the Figure, numeral 1 designates an air-conditioning unit comprising a blower motor 1a for selectively introducing the air from the inside and outside the compartment of a vehicle via a known type of air inlet device and delivering the air, an evaporator 1b for cooling and passing therethrough the air delivered by the blower motor 1a, a heater core 1c for introducing the engine cooling water to use its heat to heat and pass the blower air therethrough, and an air mixing damper 1d for adjusting the proportion of the air passed through the evaporator 1b and introduced into the heater core 1c and thereby adjusting the air temperature. Numeral 2 designates front center air outlets, 2' and 2" front side air outlets, and the air outlets include flow direction changing plate groups 2a, 2b, 2c and 2d to shift the flow direction of the air blown into the front part of the compartment. Numeral 3 designates rear center air outlets, 3' and 3" rear side air outlets, and the air outlets include flow direction changing plate groups 3a, 3b, 3c and 3d to shift the direction of the air blown into the rear part of the compartment. These air outlets are each provided with a shifting grille for manually adjusting the direction of issuing air as in the case of the known air outlets. Each of the flow direction changing plate groups of the front and rear center air outlets 2 and 3 is rotatably supported so as to be positioned successively from the opening shown by the solid line to the opening shown by the broken line and they form blowing direction shifting means. Numeral 4 designates a rear cooler unit comprising a blower motor 4a, an evaporator 4b, etc. Numerals 5, 6 and 7 designate seat switches designed respectively to close and generate a seat signal when the occupant sits in the assistant driver's seat, the rear left seat and the rear right seat, respectively. Numeral 8 designates a rear cooler switch which is mounted on the instrument panel in the front part of the driver's compartment or a position which permits the rear seat occupants to operate it and which is closed to actuate the rear cooler and generate a rear cooler signal. Numeral 9 designates temperature setting means for establishing a desired temperature, which mounted on the instrument panel or the like so as to be manually operated by the occupants to establish any desired temperature. Numeral 10 designates a compartment temperature sensor designed to detect for example a representative temperature within the compartment. Numeral 11 designates an A/D converter for converting an analog signal to a digital signal, whereby the compartment temperature signal from the compartment temperature sensor 10 and the preset temperature signal from the temperature setting means 9 are sequentially converted to digital signals.

Numeral 12 designates a digital computer designed for performing software digital computational operations in accordance with a predetermined control program and comprising a microcomputer. The microcomputer 12 is connected to a quartz crystal unit 13 of several MHz and it comes into operation when supplied with the stabilized voltage from a stabilized power supply circuit (not shown) which is supplied by the vehicle battery to generate a 5-volt stabilized voltage. The microcomputer 12 comprises, as its principal parts, a read-only memory (ROM) storing a control program which determines the sequence of operations, a central processing unit (CPU) for sequentially reading the control program from the ROM to perform the corresponding computational operations, a memory (RAM) for temporarily storing the various data associated with the operations of the CPU so as to be read out by the CPU, a clock generator including the quartz crystal unit 13 for generating the reference clock pulses required for the various operations and an input/output (I/O) circuit for the various signals. The operations performed by the microcomputer 12 result in the generation of various command signals including command signals for controlling the rotational speed of the blower motors 1a and 4a and direction changing command signals for the flow direction changing plate groups 2a, 2b, 2c, 2d, 3a, 3b, 3c and 3d of the front and rear center air outlets 2 and 3.

Numerals 14 and 15 designate motor drive circuits for respectively controlling the rotational speed of the blower motors 1a and 4a, each comprising, as shown in FIG. 2, a latch circuit 20 for latching a rotational speed indicative of digital command signal 12a from the microcomputer 12 in response to a latch command pulse signal 12b, a D/A converter 21 for converting the latched digital signal to an analog signal, an oscillator circuit 22 for generating a triangular wave signal having a fixed frequency and a fixed amplitude, a comparator circuit 23 for comparing the triangular wave signal from the oscillator circuit 22 and the analog signal from the D/A converter 21 to generate a pulse train having a fixed frequency and a duty cycle proportional to the magnitude of the analog signal and an amplifier circuit 24 for amplifying the pulse train, thus subjecting the energizing current of the blower motor to duty cycle control to control its rotational speed. Numerals 16, 17, 18 and 19 designate shifting actuators forming drive means for shifting the flow direction changing plate groups 2a, 2b, 2c, 2d, 3a, 3b, 3c and 3d of the front and rear center air outlets 2 and 3.

These shifting actuators are each designed to simultaneously drive two of the changing plate groups in response to the command from the computer 12. For example, the actuator 16 drives the changing plate groups 2a and 2b in association with each other. Thus, when the plate groups 2a and 2b are at the broken-line positions (the same applies to the other changing plates), a portion of the air from the air conditioning unit 1 is blown from the front center air outlet 2 toward the front left seat and the air is also blown into the vehicle compartment from the side air outlet 2'. When the shifting actuator 16 is operated, the changing plate groups 2a and 2b are shifted from the broken line positions toward the solid line positions in proportion to the amount of movement of the actuator 16, that is, the amount of air flow from the side air outlet 2' is decreased and simultaneously the amount of air flow from the front center air outlet 2 toward the front left seat is increased. The other shifting actuators 17, 18 and 19 are each operated in the like manner so that when the amount of stroke is small, the amount of air directly blown toward the seated occupant is small and the air is blown into the whole vehicle compartment, and when the amount of stroke is increased, the amount of air flow toward the seat is increased correspondingly.

FIG. 3 shows the construction of the shifting actuators each comprising a latch circuit 25 responsive to a command pulse 12d to latch a digital command signal 21c indicative of the amount of stroke and applied from the microcomputer 12, a D/A converter 26 for converting the latched signal to an analog signal, an error amplifier 27 and a servo motor 28 adapted to be operated by the output signal of the error amplifier 27 while feeding the amount os stroke back thereto, and the amount of shifting of the flow direction changing plates 2a and 2b (as well as 2c, 2d, 3a, 3b, 3c and 3d) is controlled by the output stroke of the servo motor 28.

With the construction described above, the operation of the embodiment will now be described with reference to the computing flowcharts shown in FIGS. 4 to 6.

Figure 5:
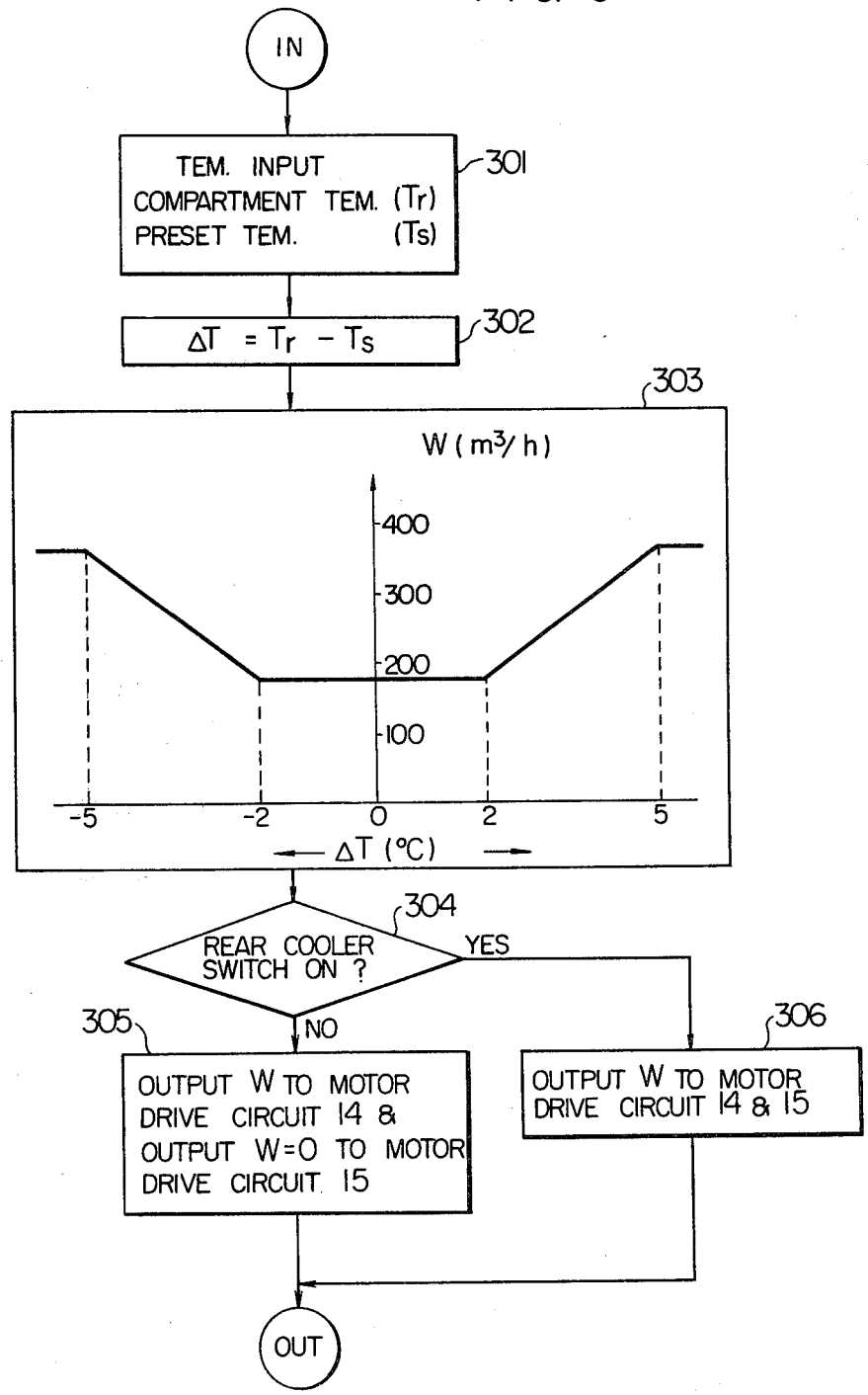
FIG. 5 is a computing flowchart showing the detailed computing operations of the blower speed controlling operational routine shown in FIG. 4.

FIG. 4 is a computing flowchart showing the overall processing operation of the microcomputer 12, FIG. 5 is a computing flowchart showing the detailed computing operations of the blower speed controlling operational routine shown in FIG. 4, and FIG. 6 is a computing flowchart showing the detailed computing operations of the blowing direction controlling operational routine shown in FIG. 4. The overall processing operation of the microcomputer 12 will be described first.

When the air conditioner switch (not shown) of the vehicle equipped with the apparatus is closed, the microcomputer 12 is supplied with the stabilized voltage from the stabilized power supply circuit which is supplied by the vehicle battery through the ignition switch (not shown) and it comes into operation to perform the computing operations of the control program at intervals of about several hundreds msec.

More specifically, the processing is started by a start step 100 of FIG. 4 and the control is transferred to an initialization step 200 which sets the registers, counters, latches, etc., of the microcomputer 12 to the initial states required for starting the processing operation and which also sends an initialization signal to each of the circuits controlled by the microcomputer 12 to set the circuits to their initial states. After the initialization has been completed, the control is transferred to a blower speed controlling operational routine 300.

The blower speed controlling operational routine 300 is such that in accordance with the compartment temperature signal from the compartment temperature sensor 10 and the preset temperature signal from the temperature setting means 9, the operations are performed so that an air flow corresponding to the difference between the compartment temperature and the preset temperature is determined and the rotational speed of the blower motor 1a as well as the rotational speed of the blower motor 4a (if the rear cooler switch 8 is on) are controlled in accordance with the determined air flow. Then, the control is transferred to the next temperature controlling operational routine 400.

In accordance with the difference between the compartment temperature and the preset temperature, the speed controlling operational routine 400 performs the operations required for adjusting the compartment temperature, such as, those for controlling the angular position of the air mixing damper 1d, the on-off operation of the compressor (not shown) and the selecting operation of the inner/outer air selection damper, and then the control is transferred to a blowing direction controlling operational routine 500.

In accordance with the difference between the compartment temperature and the preset temperature and the states of the signals from the seat switches 5, 6 and 7 and the rear cooler switch 8, the blowing direction controlling operational routine 500 performs the computing operations required for controlling the drive units of the flow direction changing plate groups 2a, 2b, 2c, 2d, 3a, 3b, 3c and 3d of the front and rear center air outlets 2 and 3, and then the control is returned to the blower speed controlling operational routine 300. Thereafter, the processing of the routines from the blower speed controlling operational routine 300 to the blowing direction controlling operational routine 500 is repeated at intervals of about several hundreds msec.

Next, the detailed computing operations of the blower speed controlling operational routine 300 in the above-mentioned repeated processing will be described with reference to the computing flowchart of FIG. 6.

The processing of the blower speed controlling operational routine 300 is started by a temperature input step 301 so that the compartment temperature signal from the compartment temperature sensor 10 and the preset temperature signal from the temperature setting means 9 are sequentially converted through the A/D converter 11 and the resulting digital signals are sequentially inputted, and the control is transferred to a difference computing step 302. The difference computing step 302 computes the difference ΔT between the compartment temperature Tr and the preset temperature Ts inputted by the temperature input step 301 from an equation ΔT=Tr−Ts, and then the control is transferred to the next air flow setting step 303. The difference ΔT computed by the difference computing step 302 is stored in a selected location of the RAM in the microcomputer 12. The air flow setting step 303 obtains an air flow W from the difference ΔT in accordance with the illustrated characteristic relationship. This characteristic relationship is preliminarily stored in the ROM of the microcomputer 12 so that the numerical range of the difference ΔT is searched and the coefficient of the linear function corresponding to the numerical range is read out. Then, the air flow W corresponding to the difference ΔT is computed. Then the control is transferred to the next rear cooler discrimination step 304 which in turn determines whether the rear cooler signal is being generated from the rear cooler switch 8. If the rear cooler signal is being generated, the determination results in "YES," and if the rear cooler signal is not being generated, the determination results in "ON" and the control is transferred to an output step 305. The output step 305 applies only to the motor drive circuit 14 a command signal corresponding to the air flow W computed by the air flow setting step 303 and the processing of the blower speed controlling operational routine 300 is completed.

On the other hand, if the determination of the rear cooler discrimination step 304 results in "YES," the control is transferred to an output step 306 so that a command signal corresponding to the air flow W computed by the air flow setting step 303 is applied to each of the motor drive circuits 14 and 15 and the processing of the blower speed controlling operational routine 300 is completed.

Next, the detailed computing operations of the blowing direction controlling operational routine 500 will be described with reference to the computing flowchart of FIG. 6.

The blowing direction controlling operational routine 500 determines the positions of the flow direction changing plate groups 2a, 2b, 2c, 2d, 3a, 3b, 3c and 3d in accordance with the difference ΔT. Firstly, a changing plate group position setting step 501 determines the amount of stroke S of the shifting actuators 16 to 19 in accordance with the illustrated characteristic relationship. This characteristic relationship is preliminarily stored in the ROM of the microcomputer 12 so that the numerical range of the difference ΔT is searched and the coefficient of the linear function corresponding to the numerical range is read out. Then the amount of stroke S corresponding to the difference ΔT is computed.

It is designed so that when the difference ΔT is large, the amount of stroke S takes the maximum value and consequently the blowing directions of the flow direction changing plates are shifted so as to concentrically direct the air toward the seats. When the difference ΔT is small, the amount of stroke S assumes the minimum value $S_o$ and consequently the blowing directions are shifted so as to direct the air uniformly on the whole.

The actuators, 16, 17, 18 and 19 are operated as follows. Firstly, an assistant driver's seat directing determination step 502 determines whether the seat signal is being generated from the seat switch 5 mounted at the assistant driver's seat. If there is no seat signal, the determination results in "ON" and the control is transferred to an assistant driver's seat directing command step 5020 applying the stroke $S_o$ to the assistant driver's seat actuator 16. Then the control is transferred to a driver's seat directing command step 504 so that a command signal is applied to the driver's seat actuator 17 to drive it to attain the stroke S obtained by the step 501 in accordance with the temperature difference ΔT. Then the control is transferred to a left rear seat directing determination step 505. On the other hand, if the determination of the assistant driver's seat directing determination step 502 results in "YES," the control is transferred to a driver's seat and assistant driver's seat directing command step 503 so that a command signal is applied to the driver's seat actuator 16 and the assistant driver's seat actuator 17 and the actuators 16 and 17 are operated to produce the stroke S corresponding to the difference ΔT. Then the control is transferred to the left rear seat directing determination step 505.

The left rear seat directing determination step 505 determines whether the seat signal is being generated from the seat switch 6. If no seat signal is being generated, the determination results in "NO" and the control is transferred to a left rear seat directing command step 5050 applying the $S_o$ to the left rear seat actuator 18. Then the control is transferred to a right rear seat directing determination step 507. On the other hand, if the determination results in "YES", the control is transferred to a left rear seat directing command step 506 so that the actuator 18 is operated to produce the stroke S corresponding to the difference ΔT and the control is transferred to the right rear seat directing determination step 507.

The right rear seat directing determination step 507 determines whether the seat signal is being generated from the seat switch 7. If there is no seat signal, the determination results in "ON" and the control is transferred to a right rear seat directing command step 509. Thus, a command signal is applied to the right rear seat actuator 19 to produce the minimum stroke $S_o$ and the actuator 19 is operated, thus completing the processing of the blowing direction controlling operational routine 500. If there is the right rear seat signal, the determination results in "YES" and the control is transferred to a right rear seat directing command step 508 and a command signal is applied to the actuator 19 to operate it so as to produce the stroke S corresponding to the difference ΔT. Thus the processing of the blowing direction controlling operational routine 500 is completed.

The operation of the apparatus will be first described with reference to the case where the temperature of the vehicle compartment is high so that the compartment temperature is higher than the preset temperature by more than 5° C. and the number of the occupants in the vehicle is two. In this case, due to the high compartment temperature condition, if the air conditioner switch is closed upon starting the vehicle, the microcomputer 12 is supplied with the stabilized voltage from the stabilized power supply circuit and it comes into operation. The processing of the microcomputer 12 is started by the start step 100 of FIG. 4 and the control is transferred to the initialization routine 200 which in turn performs the various initialization operations. Then the control is transferred to the blower speed controlling operational routine 300.

When the blower speed controlling operational routine 300 is started, the temperature input step 301 inputs the compartment temperature Tr and the preset temperature Ts, and then the control is transferred to the difference computing step 302 which in turn computes the difference $\Delta T$. In this case, since the temperature within the compartment is high, the value of the difference $\Delta T$ is greater than 5° C. As a result, the air flow W obtained by the next air flow setting step 303 has the maximum value of about 370 m$^3$/h. Then the control is transferred to the next rear cooler discrimination step 304 so that if the rear cooler switch 8 is on, its determination results in "YES" and the control is transferred to the output step 306. Thus, the command signals corresponding to the previously computed air flow W of about 370 m$^3$/h are applied to the motor drive circuits 14 and 15, thus completing one cycle of the processing of the blower speed controlling operational routine 300. Thus, the blower motor 1a is operated at a high speed.

Then, the control is transferred to the next temperature controlling operational routine 400 and the processing is performed so that the angle of opening of the air mixing damper 1d is controlled and the compressor is turned on to blow the cooled air, and then the control is transferred to the next blowing direction controlling operational routine 500.

When the blowing direction controlling operational routine 500 is started, since the value of the difference $\Delta T$ is greater than 5° C., the stroke computed by the flow direction changing plate group position setting step 501 has the maximum value of 20 mm.

Then the control is transferred to the next assistant driver's seat directing determination step 502 so that since the occupant is sitting in the assistant driver's seat, its determination results in "YES" and a command signal is applied to the actuators 16 and 17, respectively, thus operating each of the actuators to attain the stroke of 20 mm and thereby concentrically directing the air toward the driver's seat and the assistant driver's seat, respectively.

Then, the control is transferred to the next left rear seat directing determination step 505 so that since the number of the occupants is two, the determination results in "NO" and the control is transferred to the next left rear seat directing command step 5050. Thus, the command signal indicative of the minimum stroke S$_o$ is applied to the actuator 18 and the control is transferred to the next right rear seat blowing determination step 507 whose determination also results in "NO" thus applying the command signal indicative of the minimum stroke S$_o$ to the actuator 19. As a result, despite the operation of the rear cooler, the actuators 18 and 19 are operated to change the blowing of the rear cooler to the overall blowing and one cycle of the processing of the blowing direction controlling operational routine 500 is completed. Then, the control is returned to the blower speed controlling operational routine 300.

Thereafter, the processing from the blower speed controlling operational routine 300 to the blowing direction controlling operational routine 500 is repeated at intervals of about several hundreds msec, so that in the front center air outlets 2 the flow direction changing plate group 2c, 2d is directed toward the driver's seat and the flow direction changing plate group 2a, 2b is directed toward the assistant driver's seat. Thus, the maximum amount of cooled air produced by the maximum speed operation of the blower motor 1a is directed toward the driver's seat and the assistant driver's seat and the cooling by the concentrated blowing is effected.

Thereafter, when the compartment temperature is decreased gradually so that the difference between the compartment temperature and the preset temperature becomes smaller than 5° C., the air flow W computed by the air flow setting step 303 of the blower speed controlling operational routine 300 is decreased gradually. As a result, the amount of the cooled air blown into the vehicle compartment is decreased gradually.

Simultaneously, the stroke S of the flow direction changing plate group positions is decreased gradually from the maximum value and the blowing angle is gradually increased from the concentrated blowing. When the difference T between the compartment temperature Tr and the preset temperature Ts becomes less than 2° C., the air flow W is decreased to the minimum flow of about 180 m$^3$/h and the stroke of the flow direction changing plate group positions is decreased to the minimum value S$_o$ (about 4 mm). Thus, a command signal is applied to each of the motor drive circuits 14 and 15 and the actuators 16, 17, 18 and 19 to direct the air into the whole compartment from all the air outlets and the whole compartment is air-conditioned.

While the foregoing description has been made with reference to the case where the number of the occupants is two and the rear cooler is operated, where the rear cooler is not operated, the air delivered from the rear cooler unit 4 by the motor 4a is stopped as shown by an output step 307 in FIG. 5.

Where the number of the occupants is 3 or 4, the rear cooler switch 8 is closed and the directions of air flow toward the rear seats are adjusted in accordance with the seat positions by means of the flow direction changing plate groups 3a, 3b, 3c and 3d in the like manner as in the case of the front seats.

Moreover, the concentrated blowing for directing the temperature-adjusted air toward the object occupants is effected not only when the compartment temperature is high but also when the compartment temperature is low. In other words, in accordance with the characteristic relationship shown in connection with the step 501 the heated air is directed toward the object occupants concentrically when the compartment temperature is lower than a preset temperature in excess of a predetermined temperature difference.

The present invention is not intended to be limited to the above-described embodiment and the following modifications may be made to it.

(1) In addition to successively controlling the air flow between the concentrated blowing and the overall blowing with respect to all the occupants in the vehicle, the conventional manual change-over mechanism may be used so that the present invention is used only for the purpose of directing the air to particular one of the occupants such as the driver and the air is directed toward the other occupants through manual adjustments.

(2) In addition to adjusting the distribution of the air blown from a plurality of air ducts as in the case of the above-described embodiment, all or part of the ducts may each be provided with a shifting grille at its forward end (air outlet) so as to automatically control the amount of shifting of the grilles and thereby to effect the change-over between the concentrated blowing and the overall blowing.

(3) In addition to using a plurality of air ducts separately in association with the respective occupants as in the case of the above-described embodiment, it is possible to provide means such that the absence of any particular occupant closes the associated air duct or alternatively it is possible to provide means for directing the shifting grilles mentioned in the above (2) to other non-associated occupant, thus adjusting all the air flow from the air conditioning units with respect to the actual occupant or occupants and thereby successively adjusting the blowing of air between the concentrated blowing and the overall blowing.

(4) While, in the above-described embodiment, the air conditioning unit 1 is of the so-called air mixing type, it may be of the so-called reheat type comprising an evaporator, a heater core arranged downstream of the evaporator and a valve mechanism for regulating the amount of the engine cooling water flow through the heater core.

(5) A plurality of vehicle temperature sensors 10 may be provided within the vehicle compartment to use the average detected value as a representative temperature.

It will thus be seen that in accordance with the present invention the flow direction of air is successively expanded from the occupant-oriented blowing to the overall blowing between the transitional period during which the compartment temperature approaches the preset temperature and the steady-state period during which the compartment temperature is maintained at the preset temperature, thus successively and automatically providing a feeling of rapid cooling or rapid heating as well as a feeling of stable air-conditioning on the part of the occupants.

What we claim is:

1. An automobile air-conditioned control apparatus comprising:
    temperature setting means for establishing a desired temperature which is manually set by occupants;
    temperature sensor means for detecting a representative temperature within compartment of the automobile;
    seat switch means providing seat signals when the occupants occupy their seats;
    electronic control unit means for performing digital computational operations in accordance with said desired temperature signal, said representative temperature signal and said seat signals;
    motor drive circuit means responsive to command signals of said microcomputer means to provide a drive signal;
    blower motor means responsive to said drive signal for providing conditioned air into the compartment of the automobile;
    shifting actuator means responsive to the command signal of said microcomputer means for providing a shifting signal;
    outlets means having a plurality of flow direction changing plates which are actuated by said shifting signal successively and gradually.

2. An air-conditioning control apparatus for automotive vehicles in which air conditioned by conditioning means is blown into the vehicle compartment to adjust the temperature of the vehicle compartment to a target temperature, said apparatus comprising:
    evaporator means having a plurality of outlets for supplying said conditioned air to said vehicle compartment;
    shifting means for successively and gradually shifting the direction of flow of said conditioned air blown through said plurality of outlets into said vehicle compartment; and
    control means including a temperature setting means, a temperature sensor and an electronic control unit responsive to the signals from said temperature setting means and said temperature sensor for controlling the flow of said air blown from said plurality of outlets by providing a control signal to said shifting means in a manner that said air is concentrically blown to occupant positions when the difference between a vehicle compartment temperature and the target temperature becomes large and said air is scatteringly blown to the whole vehicle compartment when said difference becomes small.

3. Air-conditioning control apparatus in accordance with claim 2 wherein said electronic control unit comprises a microcomputer including a read only memory storing a control program, a central processing unit, and an additional memory for storing data including data from said temperature setting means and said temperature sensor.

4. Air-conditioning control apparatus in accordance with claim 2 including blower means for blowing said conditioned air to said vehicle compartment, and wherein said electronic control means controls the rotational speed of said blower means in response to the signals from said temperature setting means and said temperature sensor.

5. Air-conditioning control apparatus in accordance with claim 2 including seat switch means for detecting the presence of an occupant in the various seats in the vehicle compartment, said seat switch means furnishing an input to said electronic control unit for generating control signals for said shifting means.

* * * * *

UNITED STATES PATENT AND TRADEMARK OFFICE
CERTIFICATE OF CORRECTION

PATENT NO. : 4,426,852

DATED : January 24, 1984

INVENTOR(S) : Masao NISHIMURA et al

It is certified that error appears in the above-identified patent and that said Letters Patent is hereby corrected as shown below:

On the Title Page:

Item [30]  Foreign Application Priority Data read "Feb. 5, 1980" should read --May 12, 1980--

Signed and Sealed this

Second Day of April 1985

[SEAL]

Attest:

DONALD J. QUIGG

*Attesting Officer*    *Acting Commissioner of Patents and Trademarks*